(12) United States Patent
Leek et al.

(10) Patent No.: US 8,126,787 B1
(45) Date of Patent: *Feb. 28, 2012

(54) SYSTEM AND METHOD FOR PREPARING A TAX RETURN USING ELECTRONICALLY DISTRIBUTED TAX RETURN DATA

(75) Inventors: Kevin Leek, Overland Park, KS (US); Terry White, Charlotte, NC (US)

(73) Assignee: H&R Block Services, Inc., Kansas City, MO (US)

( * ) Notice: Subject to any disclaimer, the term of this patent is extended or adjusted under 35 U.S.C. 154(b) by 72 days.

This patent is subject to a terminal disclaimer.

(21) Appl. No.: 12/820,675

(22) Filed: Jun. 22, 2010

Related U.S. Application Data

(63) Continuation of application No. 10/984,204, filed on Nov. 8, 2004, now Pat. No. 7,742,958.

(51) Int. Cl.
*G06F 17/22* (2006.01)
*G06Q 40/00* (2012.01)

(52) U.S. Cl. ............ 705/31; 705/35
(58) Field of Classification Search ............ None
See application file for complete search history.

*Primary Examiner* — Ryan Zeender
*Assistant Examiner* — Denisse Ortiz Roman
(74) *Attorney, Agent, or Firm* — Standley Law Group LLP

(57) ABSTRACT

The present invention is a system and method for preparing a tax return using electronically distributed tax return data. Electronically distributed tax return data (such as W-2 data or 1099 data) that is stored at a third party's computer system for a taxpayer is accessed to prepare the tax return. The location of the electronically distributed tax return data is provided to a tax preparer that accesses the electronic data and prepares the tax return. The taxpayer provides authorization for the tax preparer to access the electronically distributed tax return data stored at the third party system. After the current tax year, the tax preparer checks the availability of the electronically distributed tax return data. When the electronically distributed tax return data is determined to be available, the tax preparer accesses it and prepares the tax return.

22 Claims, 3 Drawing Sheets

SYSTEM AND METHOD FOR PREPARING A TAX RETURN USING ELECTRONICALLY DISTRIBUTED TAX RETURN DATA

CROSS REFERENCE TO RELATED APPLICATIONS

This application claims priority to U.S. patent application Ser. No. 10/984,204, filed Nov. 8, 2004, titled SYSTEM AND METHOD FOR PREPARING A TAX RETURN USING ELECTRONICALLY DISTRIBUTED TAX RETURN DATA, now U.S. Pat. No. 7,742,958 issued Jun. 22, 2010.

FIELD OF THE INVENTION

The present invention relates generally to systems and methods for preparing tax returns. In particular, the present invention relates to accessing and using electronically distributed tax return data to prepare a tax return.

BACKGROUND OF THE INVENTION

The process of preparing a tax return requires a taxpayer to locate the relevant tax return data to be entered in the tax forms. Failure to locate the relevant tax return data can be costly to a taxpayer. If the taxpayer files a tax return using erroneous or incomplete data, he or she may incur penalties and interest for filing an inaccurate tax return. If the taxpayer postpones filing of the tax return until the relevant tax return data can be located, the taxpayer may be required to file a request for an extension of time to file the tax return. If the taxpayer prepares his or her own tax filings, he or she will be required to take extra time to prepare and file the request for the extension of time—time that could be spent locating the tax return data. If the taxpayer uses a professional tax preparation service for his or her tax filings, he or she may be required to pay a fee for a professional to prepare and file a request for an extension of time. Finally, if the taxpayer completely misses the filing deadline for the tax return or the request for the extension of time because the appropriate tax return data cannot be located, the taxpayer risks criminal penalties.

Typically, relevant tax return data is provided to taxpayers on paper forms. To ensure the availability of the data when the taxpayer is ready to prepare and file a tax return, the taxpayer must store the forms in a secure location that is readily accessible. However, finding such a location, and remembering where it is, can be difficult for taxpayers who move or travel frequently. There is a chance the forms will simply be lost during a transition. Furthermore, for these taxpayers, there is a possibility the paper forms will never be received because the forms were sent or delivered to the wrong address.

The advent of computers and electronic storage media has made the processes of storing tax return data and of preparing and filing tax returns easier. Once tax return data is entered and saved on a computer system, it is easily retrieved so that a tax return may be prepared by referring to the electronic tax return data. In many instances, the tax return data is entered and stored by the taxpayer on his or her own computer. For example, many taxpayers use spreadsheets or other programs to record data that is used in preparing a tax return. Using a spreadsheet a taxpayer may record interest and dividend income that is received throughout the tax year. Alternatively, the taxpayer may simply record total W-2 income amounts, 1099 amounts, etc. when related paper statements are received at the end of a tax year. In either case, relevant tax return data is entered and stored so that the taxpayer may retrieve it easily and refer to it when he or she is ready to prepare his or her tax return. In some instances, the taxpayer may cut and paste the data from one computer application into a tax preparation program.

More recently, tax return data is being entered and stored electronically for taxpayers so they may access it at their convenience. For example, some employers are now storing tax return data such as W-2 data at a web site and then providing their employees with access to the tax return data at the web site. Also, many financial institutions now store at web sites tax return data, such as 1099 data, that their customers may access at any time from any location.

There are many benefits to electronically storing tax data for taxpayers. First, the cost for companies providing such information may be reduced because the companies are not required to print and mail paper statements to taxpayers. Furthermore, storing tax data electronically is more reliable than sending paper forms because access to the data is location independent so that taxpayers who move or travel frequently can access their information from their current location. Because the information is stored electronically, it is accessible at any time from any location. Finally, for taxpayers who prefer to collect and store their own tax data, they may access the various sites where their tax data are stored and download the data to their computers, for example, in a local spreadsheet so that all of the tax data are available in one convenient location.

Although the availability of electronically stored tax data reduces the time it takes for taxpayers to locate and collect tax data at tax time, taxpayers must still prepare their own tax returns or arrange to have their tax returns prepared in order to comply with taxing authority filing requirements. Taxpayers must check for the availability of their tax data at a web site or other computer location or they must watch for notices from employers, financial institutions, etc. regarding the availability of tax data. Taxpayers, therefore, would benefit from a service that monitors for the availability of tax data and arranges for the preparation of a tax return without further action on the part of the taxpayer. There is a need for a tax preparation system and method that takes advantage of the availability of electronically stored tax data that may be accessed by a tax preparer to complete a tax return and that further monitors the availability of electronically stored tax data so that a tax return may be prepared and filed for taxpayer in a timely manner.

SUMMARY OF THE INVENTION

The present invention is a system and method for preparing a tax return using electronically distributed tax return data. Electronically distributed tax return data (such as W-2 data or 1099 data) that is stored at a third party's computer system (such as a web site for an employer or financial institution) for a taxpayer is used to prepare the tax return. The location of the electronically distributed tax return data (such as a web site URL) is provided to a tax preparer that accesses the electronically distributed tax return data and prepares the tax return for the taxpayer. In an example embodiment of the present invention, the taxpayer, as a customer of the tax preparer, provides authorization for the tax preparer to access the electronically distributed tax return data stored at the third party site. Electronically distributed tax return data location information is further provided to the tax preparer by the taxpayer or by the third party storing the electronically distributed tax return data for the taxpayer. After the current tax year (i.e., the beginning of the tax return preparation season), the tax preparer checks the availability of the electronically distributed tax return data. The tax preparer may use taxpayer identifying information such as a social security number, name, account number, login and password, etc. to check the availability of the electronically distributed tax return data and to access it when it becomes available. When the electronically distributed tax return data is determined to be available, the tax preparer accesses it and prepares the taxpayer's tax return. The taxpayer is notified that the tax return is complete and ready for the taxpayer's review and approval. The tax return may then be filed by the tax preparer or by the taxpayer.

In another aspect of the present invention, the availability of the electronically distributed tax return data for a tax year is monitored and a tax return is prepared by a tax preparer when the tax return data becomes available. When electronically distributed tax return data is accessed for new customers of the tax preparer, a check for electronically distributed tax return data for prior tax years is also made as third parties that provide the electronically distributed tax return data for employees and/or customers often store at their sites data for every tax year for which the taxpayer has applicable data. If data from a prior tax year is available, the taxpayer is asked by the tax preparer whether a tax return for the prior tax year has been filed. If not, the tax preparer advises the taxpayer of the need to file a tax return for every year and offers to prepare and file the tax return. If a tax return was filed for the prior tax year(s), it may be amended if necessary.

In another aspect of the present invention, the tax preparer may further ask the taxpayer for authorization to prepare tax returns in future years. If the taxpayer provides the authorization, the tax preparer may begin the process of monitoring the availability of electronically distributed tax return data stored for the taxpayer at a third party site. Once the electronically distributed tax return data is located, the tax preparer prepares a tax return for the taxpayer. The taxpayer is then notified that the tax return is available for approval and filing. The taxpayer may visit the tax preparer's office to review and approve the tax return or the tax preparer may arrange to send the tax return via regular mail, fax, or email to the taxpayer for review and approval. Once approved, the tax return may be filed by the tax preparer or by the taxpayer.

The present invention provides many benefits to a taxpayer who may have difficulty locating tax return data. The electronically distributed tax return data that is used to prepare the taxpayer's tax return is entered and stored by a third party so it may be accessed as needed by the taxpayer or a tax preparer. For taxpayers who move or travel frequently, there is no danger, as with paper forms, that the information will be sent or delivered to the wrong address. Furthermore, the taxpayer is not required to find a location to store the paper forms and then remember where they are located. Because the electronically distributed tax return data is readily accessible, there is no need for the taxpayer to file a request for an extension of time so that additional time may be devoted to locating the tax return data.

The present invention further assists taxpayers in complying with taxing authority requirements because a tax preparer initiates the process of preparing and filing a tax return when the taxpayer's electronically distributed tax return data becomes available. For taxpayers that provide authorization, the tax preparer monitors the availability of the tax return data and prepares the tax return once the necessary data are available. No additional action on the part of the taxpayer is required. The tax preparer accesses the electronically distributed tax return data and prepares a tax return. The taxpayer is notified that the tax return is complete and ready for review.

In addition to the convenience provided to a taxpayer by the present invention, many taxpayers will further benefit from the expertise of a tax preparer in completing the tax returns. The tax preparer may assist the taxpayer in getting the benefits of all deductions to which the taxpayer is entitled. The tax preparer's access to the tax return data may be helpful to the tax preparer in performing other functions for the taxpayer such as preparing other filings and calculating estimated payments. Finally, access to prior year data may allow the tax preparer to compare prior year information for the purpose of analyzing the taxpayer's financial situation and suggesting other ways in which the taxpayer may reduce his or her tax liability.

DESCRIPTION OF EXAMPLE EMBODIMENTS

Figure 1:
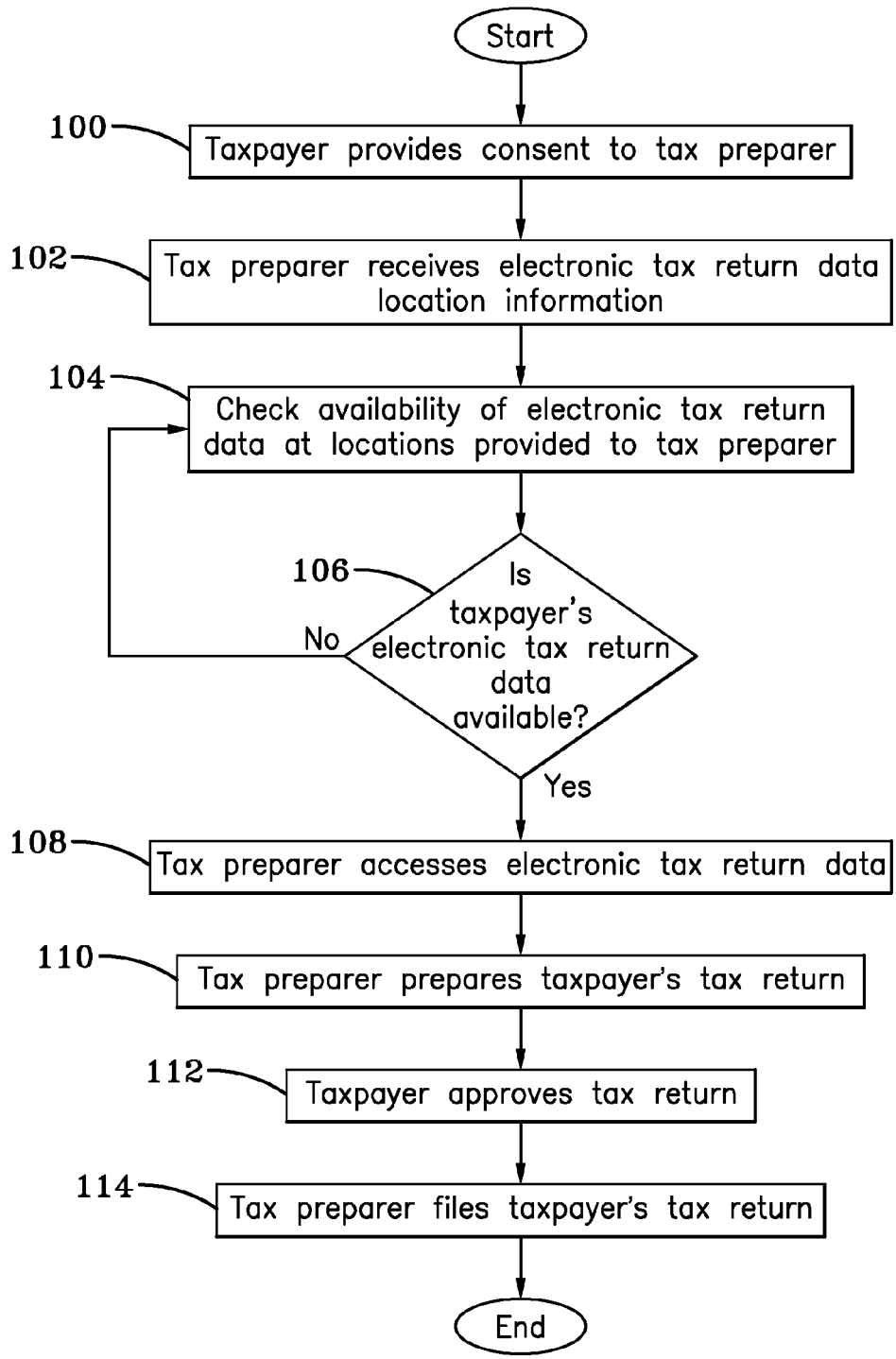
FIG. 1 is a flow diagram for preparing a tax return using electronically distributed tax return data according to an example embodiment of the present invention.

Referring to FIG. 1 a flow diagram for preparing a tax return using electronically distributed tax return data according to an example embodiment of the present invention is shown. In the first step 100, a taxpayer provides to a tax preparer authorization to have the tax preparer perform services for the taxpayer. The authorization may relate to tax preparation services provided by the tax preparer for the current tax year as well as for prior tax years and for future tax years. The taxpayer further authorizes the tax preparer to monitor for the availability of electronically distributed tax return data on third party computer systems. In addition to the authorization, the taxpayer provides electronically distributed tax return data location information 102. For example, electronically distributed tax return data may be stored at a secure web site maintained by the third party. The third party provides the taxpayer with location information (e.g., a URL where the electronically distributed tax return data may be located) as well as information describing the procedure for accessing the electronically distributed tax return data (e.g., a social security number, account number, login and password, etc.). At the site, the tax return data may be provided on a web page, in a file such as a portable document format file, or any other manner as determined by the third party. This location and access procedure information is then shared with the tax preparer so that the availability of the electronically distributed tax return data may be monitored. The taxpayer may communicate the location and access procedure information by telephone, by fax, by email, by regular mail, etc.

In the next step 104, the tax preparer checks the availability of the electronically distributed tax return data at the location(s) identified by the taxpayer. The monitoring may be performed automatically by the tax preparer's computer system. The tax preparer's computer system may be programmed to accept the location and access procedure information provided by the taxpayer and to access the third party computer system where the electronically distributed tax return data is located. For example, if the electronically distributed tax return data is stored at a secure web site, the tax preparer's computer may use the URL and access procedure information (e.g., login/password) to perform an operation that results in a determination of the availability of the electronically distributed tax return data. If the tax return data is provided on a web page, the presence of the data on the page may be determined. If the tax return data is provided in a file such as a portable document format file, the presence of the file may be determined. The tax preparer may then be notified automatically (e.g., by email) that the electronically distributed tax return data is available. Alternatively, the third party computer system could be programmed to notify the tax preparer directly (e.g., by email) of the availability of the electronically distributed tax return data. Finally, the availability of the electronically distributed tax return data may be monitored manually by directly accessing the third party computer system, entering the access procedure information (e.g., login/password), and navigating the third party computer system to locate the electronically distributed tax return data.

The availability of electronically distributed tax return data for the current tax year as well as prior tax years and future tax years may be determined in this step. If the taxpayer provides authorization for current or prior tax years, the monitoring may begin as soon as the tax preparer receives authorization. If the taxpayer provides authorization for future tax years, the monitoring may begin as soon as the current tax year ends. In this regard, further involvement of the taxpayer is not required until the tax return is prepared and ready to be reviewed by the taxpayer. Availability of electronically distributed tax return data is checked periodically, either automatically or manually, until it is determined to be available 106.

When the electronically distributed tax return data is available, the tax preparer accesses it to prepare the taxpayer's tax return 108. The tax preparer may manually access the third party computer system using the location information provided by the taxpayer, enter the access procedure information (e.g., login/password), and navigate the third party computer system to locate the electronically distributed tax return data. The electronically distributed tax return data may then be entered by the tax preparer into the tax return 110 (e.g., by cutting and pasting it from a web page or by accessing a file such as a portable document format file, reading the data therefrom and manually entering the data into the tax return through a keyboard means or through handwritten means). The tax return may be prepared by the tax preparer using a computerized tax preparation system or manually. In addition, the tax preparer may access paper statements and enter data from other sources manually in order to complete the tax return. When the tax return is complete, the taxpayer is notified and asked to approve the tax return 112. The taxpayer may meet with the tax preparer to review and approve the tax return. Alternatively, the taxpayer may use an online approval process in which the taxpayer logs on to a secure site where the completed tax return is available. The taxpayer may establish an online account that is accessible using a username and password. The taxpayer accesses the return using the account information and is then prompted to approve the return. Upon receiving approval by the taxpayer, the tax preparer may arrange to file the taxpayer's tax return 114. Alternatively, the taxpayer may file the completed tax return.

For taxpayers that provide authorization to have the tax preparer prepare their tax returns for future tax years, the involvement of the taxpayer is not required until the tax return is prepared and ready to be filed. The tax preparer obtains the necessary tax return data on behalf of the taxpayer and prepares the tax return without assistance from the taxpayer. When the current tax preparation season begins, the taxpayer is not required to locate the tax return data and furthermore, need not contact the tax preparer to request tax preparation services. The services of the present invention therefore, provide a substantial benefit to taxpayers who may otherwise find it difficult to comply with tax authority filing requirements. Additional benefits include convenience, accuracy, and speed. The taxpayer's involvement is minimal and the ability to file a tax return as soon as the necessary tax return data is available means that taxpayers entitled to refunds will receive them more quickly.

Similar benefits may also be realized by taxpayers who have failed to comply with filing requirements for prior tax years. For taxpayers that provide authorization to have the tax preparer prepare their tax returns for prior tax years, the present invention determines the availability of the electronically distributed tax return data for prior tax years so that tax returns for prior tax years may be prepared and filed. The tax preparer may also assist with filing an amended tax return for a prior tax year if the taxpayer filed a tax return but did not use the correct tax data. The services of the present invention therefore, provide a substantial benefit to taxpayers who have previously failed to comply with tax authority filing requirements.

Figure 2:
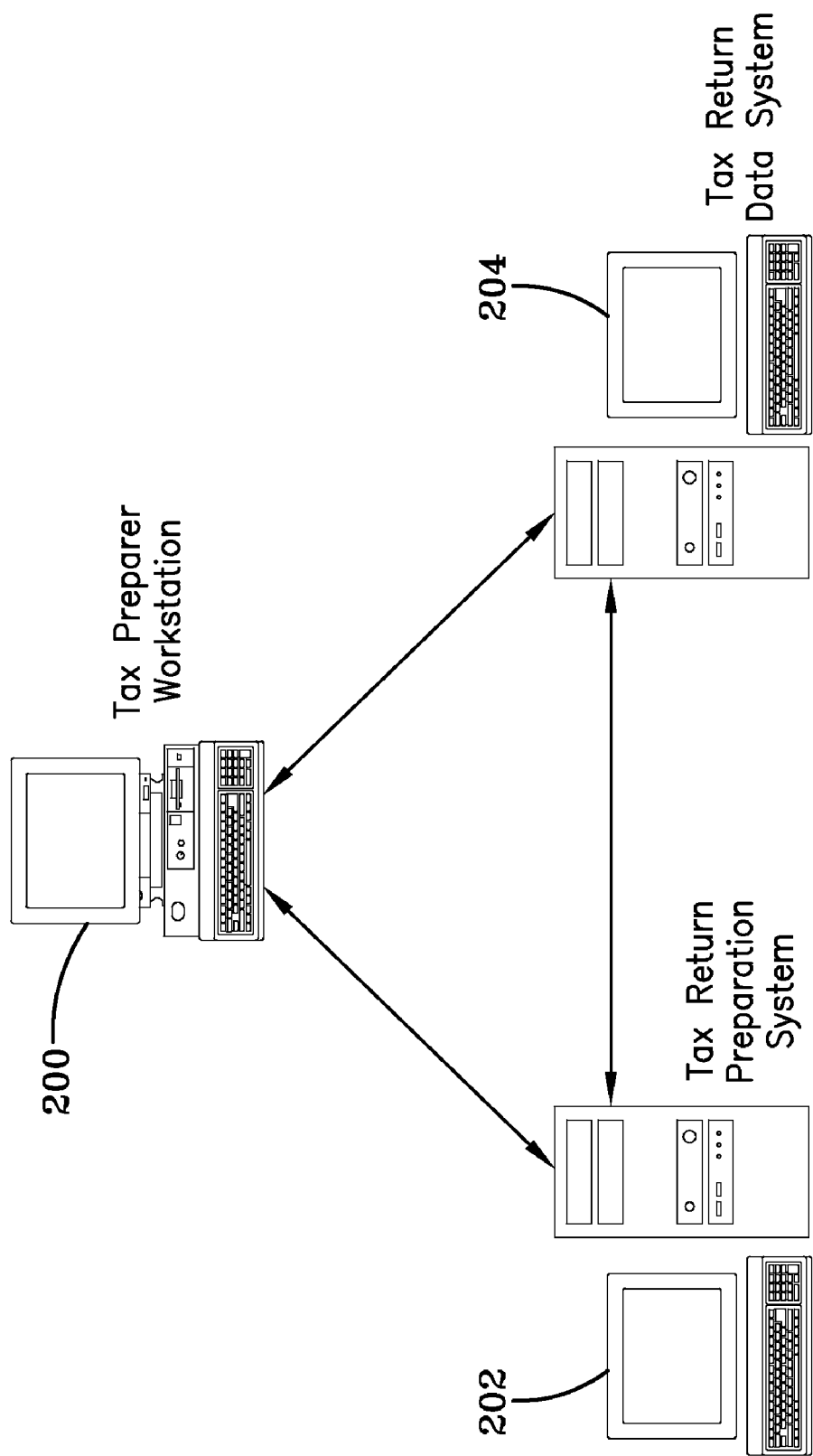
FIG. 2 is a system architecture diagram for monitoring availability of electronically distributed tax return data according to an example embodiment of the present invention.

Referring to FIG. 2, a system architecture diagram for monitoring availability of electronically distributed tax return data according to an example embodiment of the present invention is shown. A tax return preparation system 202 at a field office of a tax preparer may be used to monitor the availability of electronically distributed tax return data at a third party's tax return data system 204. A tax preparer working at a tax preparer workstation may enter in the workstation electronically distributed tax return data location and access procedure information. The tax return preparation system 202 may be programmed to accept the location and access procedure information provided by the taxpayer through the tax preparer workstation 200 and to access the tax return data system 204 where the electronically distributed tax return data is located. For example, if the electronically distributed tax return data is stored at a secure web site, the tax return preparation system 202 may use the URL and access procedure information (e.g., login/password) to perform an operation that results in a determination of the availability of the electronically distributed tax return data. If the tax return data is provided on a web page, the presence of the data on the page may be determined. If the tax return data is provided in a file such as a portable document format file, the presence of the file may be determined. The tax preparer may then be notified automatically (e.g., by email) that the electronically distributed tax return data is available. Alternatively, the tax return data system 204 could be programmed to notify the tax preparer directly (e.g., by email) of the availability of the electronically distributed tax return data. Finally, the availability of the electronically distributed tax return data may be monitored manually by directly accessing the tax return data system 204 using the tax preparer workstation 200, entering the access procedure information (e.g., login/password), and navigating the tax return data system 204 to locate the electronically distributed tax return data.

Figure 3:
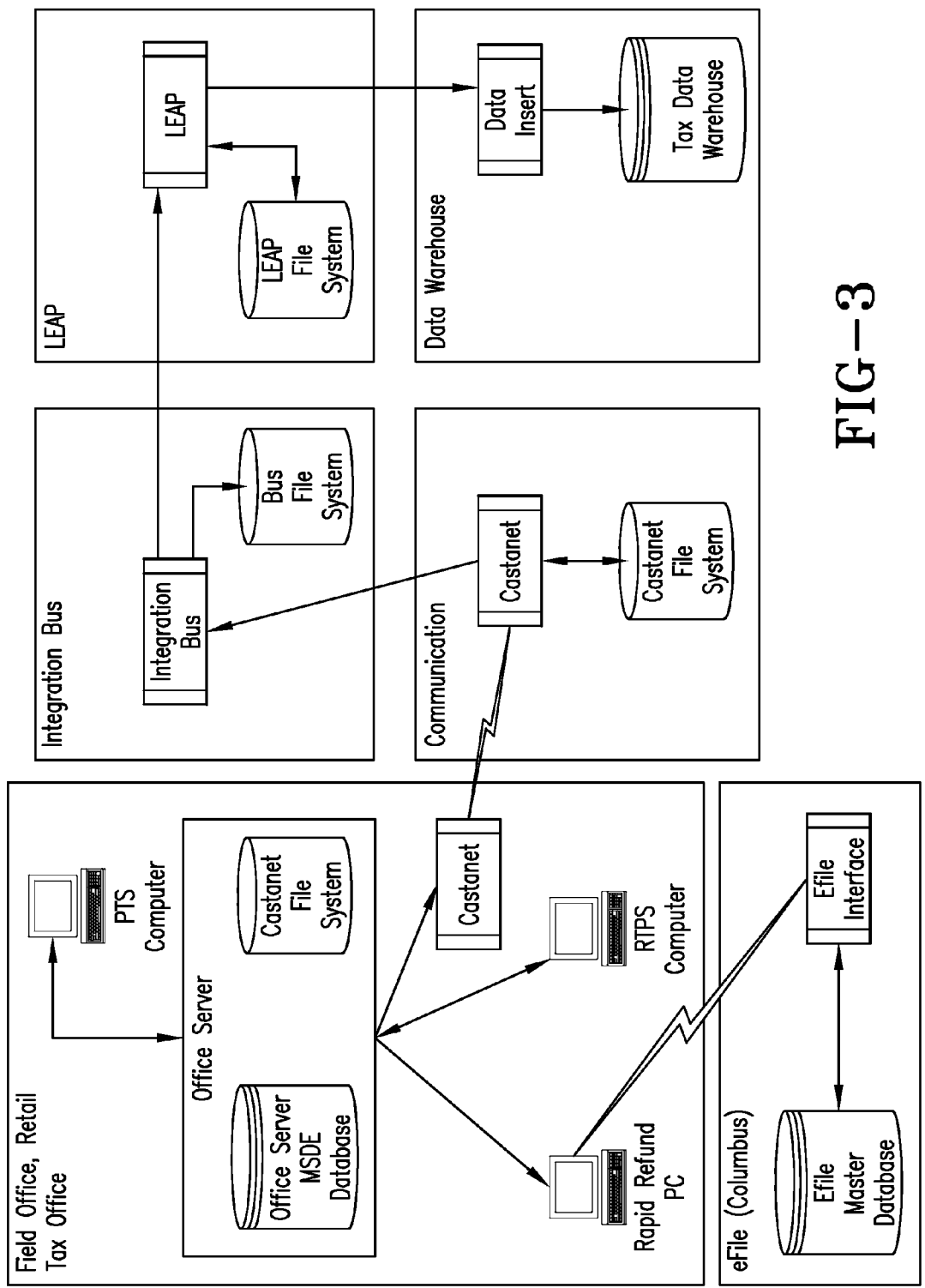
FIG. 3 is a system architecture diagram for a tax preparation system using electronically distributed tax return data according to an example embodiment of the present invention.

Referring to FIG. 3, a system architecture diagram for a tax preparation system using electronically distributed tax return data for an example embodiment of the present invention is shown. The present invention comprises multiple client and server computers, databases, and communication links in order to provide various tax return preparation features and functionality. Computers may be organized into subnetworks or subsystems including a field office or retail tax office system 300 for preparing tax returns, an efile system 304 for electronically filing tax returns with taxing authorities, a communication system 306 for transferring data from field or retail tax offices to a data warehouse system 310, and an integration bus system 304 and LEAP file system 308 for facilitating data transfers to the data warehouse system 310. The systems together comprise a complete network of computers to support the various tax preparation systems and methods of the present invention. Communication links between the subnetworks or subsystems allow taxpayer data, tax return data, and tax preparer data to be transferred between computers as needed so that taxpayers are served according to their needs.

As shown in FIG. 1, a field office or retail tax office system 300 comprises a plurality of client computers such as 1) a professional tax service (PTS) client computer 320 that may be used by a tax professional who interacts with taxpayers and who reviews, optionally signs, and optionally files tax returns with taxing authorities, 2) a RTPS computer 326 that may be used by a tax preparer to prepare and optionally file tax returns for retail taxpayer customers, and 3) an efile computer 324 for efiling tax returns with taxing authorities. The PTS computer 320, RTPS computer 326, and efile computer 324 may be served by a field office server 322 that processes requests to obtain data from and save data to an office server database 322a. In an example embodiment of the present invention, the database 322a is a Microsoft® SQL Server Data Engine (MSDE) database. The field office server 322 may further comprise a file system 322b for facilitating file transfers of data to and from other computers in the network. In an example embodiment of the present invention, Marimba® Castanet® is used to facilitate file transfers.

The RTPS software employed by tax preparers or tax professionals on RTPS computers 326 at field or retail tax offices may comprise the following features and functionality:

TABLE 2

RTPS Functionality

Automate preparation of tax returns using a specific tax preparation flow:

1. initialize tax return using taxpayer's prior year tax return, if any
2. import tax data into tax forms and modify data as needed
3. diagnose state of correctness or completeness of the tax return and correct errors
4. calculate federal and state income tax due or refund
5. generate federal and state tax documents and taxpayer's copies
6. generate proper data for e-filing the federal and/or state return
7. check the return e-file status
8. calculate tax preparation fees for billing
9. provide other products or services and/or advice to taxpayer Manage prepared taxpayer returns and completed transactions:

1. track tax returns prepared in field office
2. track other transactions completed in field office
3. sort tax returns based on type, origin, and status of completion
4. export, import, copy, delete, and edit tax returns
5. provide access to tax return receipt
6. generate reports to summarize field office activity and activity of each tax preparer or tax professional
7. provide access to tax return historical data The PTS software employed by tax professionals on PTS computers 320 at field or retail tax offices may comprise the following features and functionality:

TABLE 3

PTS Functionality

Provide professional tax services (PTS) by using online capabilities that allow PTS-graded tax preparers (tax professionals) in the field office to communicate with online taxpayers via a central online tax preparation system:

1. allow PTS preparers to check for new online taxpayer requests for servicing
2. allow PTS preparers to examine the status of taxpayer requests currently in service
3. allow PTS preparers to download a taxpayer tax return started online and to complete the return using a retail tax preparation system
4. allow PTS preparers to upload complete tax returns to an online tax preparation system for taxpayer approval
5. allow PTS preparers to download a tax return (prepared using an online tax preparation system or tax software) for professional review in a field office
6. allow PTS preparers to communicate with taxpayers through message boards
7. allows PTS preparers to receive messages broadcast from the world headquarters
8. provide PTS preparers with access to tax calculators
9. provide PTS preparers with access to library for printing tax documents Tax returns according to the present invention may be prepared using RTPS computers 320. Taxpayer data and completed tax return data are stored at the office server MSDE database 332a. The tax returns of taxpayers that are to be filed electronically are efiled using an efile system 302 comprising an efile interface 330 and efile master database 332. Taxpayer data and completed tax return data from multiple field or retail tax offices may be transferred to a data warehouse system 310 using Castanet interfaces 328, 338 and a Castanet file system 340, an integration bus system 304 comprising an integration bus interface 334 and integration bus file system 336, and a LEAP interface 342 and LEAP file system 344. Taxpayer and tax return data from field or retail tax offices is stored at a tax data warehouse database 348 using a data insert interface 346.

The present invention provides benefits to taxpayers who may have difficulty locating tax return data and complying with tax filing requirements of taxing authorities. With the present invention, electronically distributed tax return data is stored by third parties for taxpayers and with the authorization of taxpayers, accessed by a tax preparer to prepare a tax return using the electronically distributed tax return data. Taxpayers provide to a tax preparer authorization as well as location and access procedure information for electronically distributed tax return data in order to have a tax return prepared. Taxpayers may authorize the tax preparer to access electronically distributed tax return data not only for the current tax year but for prior and future tax years as well. If the tax preparer offers other services such as refund anticipation loans and tax advisory services, such services may be offered to the taxpayer in connection with the tax return preparation services of the present invention.

While example embodiments of the invention have been illustrated and described, various modifications and combinations can be made without departing from the spirit and scope of the invention. For example, the procedures for accessing electronically distributed tax return data may be modified and fall within the scope of the present invention. Furthermore, the features and functionality of the tax preparation systems and tax return data systems may be modified and fall within the scope of the present invention. Modifications, combinations, and equivalents to the system and method of the present invention are intended to be covered and claimed.

What is claimed is:

1. A computerized method for preparing a tax return comprising:
   (a) obtaining authorization from a taxpayer to monitor for availability of electronically distributed tax return data on a third party computer;
   (b) receiving from said taxpayer location information for accessing said electronically distributed tax return data from said third party computer;
   (c) entering in a computer said location information;
   (d) initiating at said computer an automated process for periodically checking availability of said electronically distributed tax return data at said third party computer using said taxpayer location information;
   (e) in response to automatically checking availability at said computer, notifying a tax preparer of availability of said electronically distributed tax return data;
   (f) receiving at said computer from said tax preparer a request to access said electronically distributed tax return data at said third party computer using said location information;
   (g) providing said tax preparer with access to said electronically distributed tax return data at said third party computer;
   (h) receiving at said computer for manual entry in a tax preparation system tax return data from said electronically distributed tax return data;
   (i) preparing at said computer a tax return using said manually entered tax return data; and
   (j) notifying said taxpayer that said tax return has been prepared.

2. The method of claim 1 wherein said electronically distributed tax return data is electronically distributed tax return data for a current tax year.

3. The method of claim 1 wherein said electronically distributed tax return data is electronically distributed tax return data for a prior tax year.

4. The method of claim 1 wherein said request to access said electronically distributed tax return data is a request to access said electronically distributed tax return data in a portable document format file.

5. The method of claim 1 wherein said request to access said electronically distributed tax return data is a request to access said electronically distributed tax return data from a web site.

6. The method of claim 1 wherein notifying a tax preparer of availability of said electronically distributed tax return data comprises notifying said tax preparer of availability of said electronically distributed tax return data by email.

7. The method of claim 6 wherein notifying said tax preparer of availability of said electronically distributed tax return data by email comprises receiving said email from said third party computer system.

8. The method of claim 1 wherein providing said tax preparer with access to said electronically distributed tax return data at said third party computer comprises providing said tax preparer with options for navigating said third party computer system to locate said electronically distributed tax return data.

9. The method of claim 1 further comprising receiving from said taxpayer approval to file said tax return.

10. The method of claim 9 wherein receiving from said taxpayer approval to file said tax return comprises receiving from said taxpayer approval using an online approval process.

11. The method of claim 10 wherein said online approval process comprises providing said taxpayer with access to said tax return using a secure web site.

12. A computerized system for preparing a tax return comprising:
   (a) a database storing taxpayer profile data comprising:
      (i) authorization data from a taxpayer to monitor for availability of electronically distributed tax return data on a third party computer;
      (ii) location data for accessing said electronically distributed tax return data from said third party computer;
   (b) a computer server configured to execute a software process to:
      (i) periodically check availability of said electronically distributed tax return data at said third party computer using said location data;
      (ii) in response to automatically checking availability at said third party computer, notify a tax preparer of availability of said electronically distributed tax return data;
      (iii) receive from said tax preparer a request to access said electronically distributed tax return data at said third party computer using said location information;
      (iv) provide said tax preparer with access to said electronically distributed tax return data at said third party computer;
      (v) receive from said tax preparer for manual entry in a tax preparation system tax return data from said electronically distributed tax return data;
      (vi) generate a tax return using said manually entered tax return data; and
      (vii) notify said taxpayer that said tax return has been prepared.

13. The system of claim 12 wherein said electronically distributed tax return data is electronically distributed tax return data for a current tax year.

14. The system of claim 12 wherein said electronically distributed tax return data is electronically distributed tax return data for a prior tax year.

15. The system of claim 12 wherein said request to access said electronically distributed tax return data is a request to access said electronically distributed tax return data in a portable document format file.

16. The system of claim 12 wherein said request to access said electronically distributed tax return data is a request to access said electronically distributed tax return data from a web site.

17. The system of claim 12 wherein notifying a tax preparer of availability of said electronically distributed tax return data comprises notifying said tax preparer of availability of said electronically distributed tax return data by email.

18. The system of claim 17 wherein notifying said tax preparer of availability of said electronically distributed tax return data by email comprises receiving said email from said third party computer system.

19. The system of claim 12 wherein providing said tax preparer with access to said electronically distributed tax return data at said third party computer comprises providing said tax preparer with options for navigating said third party computer system to locate said electronically distributed tax return data.

20. The system of claim 12 wherein said software process further receives from said taxpayer approval to file said tax return.

21. The system of claim 20 wherein receiving from said taxpayer approval to file said tax return comprises receiving from said taxpayer approval using an online approval process.

22. The system of claim 21 wherein said online approval process comprises providing said taxpayer with access to said tax return using a secure web site.

\* \* \* \* \*